(12) United States Patent
Kim

(10) Patent No.: US 9,626,346 B2
(45) Date of Patent: Apr. 18, 2017

(54) METHOD OF IMPLEMENTING STRUCTURED AND NON-STRUCTURED DATA IN AN XML DOCUMENT

(71) Applicant: Young Kun Kim, Giheung-gu, Yongin-si (KR)

(72) Inventor: Young Kun Kim, Giheung-gu, Yongin-si (KR)

( * ) Notice: Subject to any disclaimer, the term of this patent is extended or adjusted under 35 U.S.C. 154(b) by 33 days.

(21) Appl. No.: 14/414,281

(22) PCT Filed: Apr. 29, 2013

(86) PCT No.: PCT/KR2013/003672
§ 371 (c)(1),
(2) Date: Jan. 12, 2015

(87) PCT Pub. No.: WO2014/010819
PCT Pub. Date: Jan. 16, 2014

(65) Prior Publication Data
US 2015/0149887 A1    May 28, 2015

(30) Foreign Application Priority Data

Jul. 12, 2012    (KR) .................. 10-2012-0075954

(51) Int. Cl.
G06F 17/00    (2006.01)
G06F 17/22    (2006.01)
G06F 17/24    (2006.01)

(52) U.S. Cl.
CPC ........ *G06F 17/227* (2013.01); *G06F 17/2247* (2013.01); *G06F 17/243* (2013.01)

(58) Field of Classification Search
CPC ... G06F 17/2247; G06F 17/227; G06F 17/243
See application file for complete search history.

(56) References Cited

U.S. PATENT DOCUMENTS 6,182,029 B1 *  1/2001  Friedman ............ G06F 17/2705
                                                  704/9
6,279,006 B1 *  8/2001  Shigemi ............... G06F 17/2725
(Continued)

FOREIGN PATENT DOCUMENTS

JP        EP 1122652 A1 *  8/2001  ....... G06F 17/30569
KR    10-2005-0108919        11/2005
(Continued)

OTHER PUBLICATIONS

Bob DuCharme, XSLT Quickly, 2001, Manning Publications Co., pp. 3-4.*
(Continued)

*Primary Examiner* — Laurie Ries
(74) *Attorney, Agent, or Firm* — Dentons US LLP

(57) ABSTRACT

The inventions generally relate to methods of implementing structured and non-structured data in an XML document including, designing a source HTML document that contains form tags, designing a structured source XML document using user-defined tags, designing a web form document by mapping absolute path variables of the user-defined tags into the source HTML document, automatically creating an XSL document by XSLT-processing the web form document, inputting structured data and non-structured data to the web form document, automatically creating a new XML document by replacing the absolute path variable of the user-defined tag with the structured data and the non-structured data input to the web form document and automatically displaying the content of the new XML document by merging the new XML document and the XSL document.

16 Claims, 24 Drawing Sheets

(56) References Cited

U.S. PATENT DOCUMENTS

| | | | |
|---|---|---|---|
| 6,418,448 B1* | 7/2002 | Sarkar | G06F 17/30893 |
| 6,487,566 B1* | 11/2002 | Sundaresan | G06F 17/227 |
| | | | 715/235 |
| 6,519,597 B1* | 2/2003 | Cheng | G06F 17/30595 |
| 6,538,673 B1* | 3/2003 | Maslov | G06F 17/3089 |
| | | | 707/E17.116 |
| 6,557,043 B1* | 4/2003 | Fletcher | H04L 29/06 |
| | | | 709/219 |
| 6,606,620 B1* | 8/2003 | Sundaresan | G06F 17/3061 |
| 6,725,231 B2* | 4/2004 | Hu | G06F 19/321 |
| | | | 707/809 |
| 6,763,499 B1* | 7/2004 | Friedman | G06F 17/272 |
| | | | 715/240 |
| 6,804,662 B1* | 10/2004 | Annau | G06F 17/30637 |
| 6,829,745 B2* | 12/2004 | Yassin | G06F 17/2247 |
| | | | 715/236 |
| 6,874,146 B1* | 3/2005 | Iyengar | G06F 17/2247 |
| | | | 707/999.101 |
| 6,920,607 B1* | 7/2005 | Ali | G06F 8/38 |
| | | | 707/E17.117 |
| 6,950,985 B2* | 9/2005 | Lee | G06F 17/30896 |
| | | | 707/E17.118 |
| 6,961,760 B2* | 11/2005 | Li | G06F 17/30896 |
| | | | 707/E17.118 |
| 7,168,035 B1* | 1/2007 | Bell | G06F 17/2247 |
| | | | 715/234 |
| 7,334,187 B1* | 2/2008 | Stanciu | G06F 17/2247 |
| | | | 715/222 |
| 7,831,904 B2* | 11/2010 | Kim | G06F 17/2247 |
| | | | 715/234 |
| 8,713,429 B2* | 4/2014 | Kraus | G06F 17/24 |
| | | | 715/243 |
| 8,762,398 B2* | 6/2014 | Kim | G06F 17/30917 |
| | | | 707/756 |
| 9,122,664 B2* | 9/2015 | Zhang | G06F 17/211 |
| 2002/0073119 A1* | 6/2002 | Richard | G06F 17/30569 |
| | | | 715/239 |
| 2003/0046317 A1* | 3/2003 | Cseri | G06F 17/218 |
| | | | 715/234 |
| 2003/0055748 A1* | 3/2003 | Bezrukov | G06F 17/2247 |
| | | | 715/202 |
| 2003/0120686 A1* | 6/2003 | Kim | G06F 17/218 |
| 2004/0044961 A1* | 3/2004 | Pesenson | G06F 17/3092 |
| | | | 715/239 |
| 2004/0189716 A1* | 9/2004 | Paoli | G06F 17/243 |
| | | | 715/853 |
| 2005/0010896 A1* | 1/2005 | Meliksetian | G06F 17/30917 |
| | | | 717/106 |
| 2008/0126396 A1* | 5/2008 | Gagnon | G06F 17/248 |
| 2013/0132826 A1* | 5/2013 | Kim | G06F 17/30917 |
| | | | 715/239 |

FOREIGN PATENT DOCUMENTS

| | | |
|---|---|---|
| KR | 10-2006-0019709 | 3/2006 |
| KR | 10-2008-0027251 | 3/2008 |
| KR | 10-1122629 | 3/2012 |
| KR | 10-2012-0072045 | 7/2012 |

OTHER PUBLICATIONS

Yoshikawa, Masatoshi, et al, "XRef: A Path-Based Approach to Storage and Retrieval of XML DOcuments Using Relational Databases", Jul. 2001, ACM Transactions on Internet Technology (TOIT): vol. 1, Issue 1, pp. 110-141.*

* cited by examiner

FIGURE 7 personal details form

▶ personal information

| name | | gender | ○ male ○ female |
|---|---|---|---|
| address | | | |
| experience in XML | nothing ▼ | | |
| available programming language | ☐ HTML&CSS ☐ Java Script ☐ XML ☐ JSP ☐ ASP ☐ CSP ☐ Oracle ☐ Cache ☐ etc. | | |

▶ family relations

[Add] [Delete]

| | relation | name |
|---|---|---|
| ☐ | | |

| form | name | source |
|---|---|---|
| ▭ | Input Box | \<INPUT name=root/contents/personalInfo/name\> |
| ▭ | Textarea | \<TEXTAREA name=root/contents/personalInfo/address\>\</TEXTAREA\> |
| ☐ HTML&CSS ☐ Java Script | Checkbox | \<INPUT name=root/contents/personalInfo/useLanguage value=html-css type=checkbox\>HTML<br>\<INPUT name=root/contents/personalInfo/useLanguage value=js type=checkbox\>Java |
| ○ male  ○ female | Radio Button | \<INPUT name=root/contents/personalInfo/gender value=male type=radio\>male \<INPUT name=root/contents/personalInfo/gender value=female type=radio\>female |
| [nothing ▼] | Select Box | \<SELECT name=root/contents/personalInfo/useXML\><br>\<OPTION selected value=none\>nothing<br>\</OPTION\><br>\<OPTION value=low\>beginner's level<br>\</OPTION\><br>\<OPTION value=middle\>experience in development<br>\</OPTION\><br>\<OPTION value=high\>professional level<br>\</OPTION\><br>\</SELECT\> |
| relation \| name | Repeat Table | \<TR\><br>\<TD\><br>\<INPUT onfocus=this.blur() name=rowcheck_1 type=checkbox\><br>\</TD\><br>\<TD\><br>\<INPUT style="BORDER-BOTTOM: black 1px solid; BORDER-LEFT: black 1px solid; BORDER-TOP: black 1px solid; BORDER-RIGHT: black 1px solid" name=LIST_root/contents/familyInfo/relation size=3\><br>\</TD\> |

FIGURE 12

```
<?xml version="1.0" encoding="UTF-8"?>
<!-- File Name: C:\Xbook_pub\webform\xmlWdd_0001.xsl -->
<xsl:stylesheet xmlns:dc="http://purl.org/dc/elements/1.1/"
xmlns:dcterms="http://purl.org/dc/terms/"
xmlns:xsl="http://www.w3.org/1999/XSL/Transform" version="1.0">
<xsl:decimal-format name="digit" decimal-separator="." grouping-
separator="," infinity="∞" minus-sign="-" NaN="0" percent="%" per-
mille="μ" zero-digit="0" digit="#" pattern-separator=";" />
<xsl:output method="html" doctype-
system="http://www.w3.org/TR/xhtml1/DTD/xhtml1-transitional.dtd" doctype-
public="-//W3C//DTD XHTML 1.0 Transitional//EN" indent="yes" />

<xsl:template match="/">
```

Source code for XSL Head (110)

FIGURE 13

```
<html>
<head>
  <style>
    strong {color:red;}
  </style>
  <script language="JavaScript"
  src="http://www.basexml.com:57773/xdrp/sys/lib/scripts/bxform.js"></script>
  ...
</head>
<body>
</body>
</html>
```

Source code for XSL Body (120)

FIGURE 14

```
</xsl:template>
<xsl:template match="BR"><br/></xsl:template>
<xsl:template match="br"><br/></xsl:template>
<xsl:template match="LI"><LI/></xsl:template>
<xsl:template match="LI"><LI/></xsl:template>
<xsl:template match="A">
<xsl:element name="a">
        <xsl:attribute name="href"><xsl:value-of select="@href"/></xsl:attribute>
        <xsl:attribute name="target"><xsl:value-of select="@target"/></xsl:attribute>
        <xsl:attribute name="title"><xsl:value-of select="@title"/></xsl:attribute>
        <xsl:attribute name="class"><xsl:value-of select="@class"/></xsl:attribute>
        <xsl:value-of select="."/>
</xsl:element>
</xsl:template>
<xsl:template match="FONT">
<xsl:element name="FONT">
        <xsl:attribute name="color"><xsl:value-of select="@color"/></xsl:attribute>
        <xsl:attribute name="title"><xsl:value-of select="@title"/></xsl:attribute>
        <xsl:attribute name="face"><xsl:value-of select="@face"/></xsl:attribute>
        <xsl:attribute name="style"><xsl:value-of select="@style"/></xsl:attribute>
        <xsl:attribute name="id"><xsl:value-of select="@id"/></xsl:attribute>
        <xsl:attribute name="class"><xsl:value-of select="@class"/></xsl:attribute>
        <xsl:value-of select="."/>
</xsl:element>
</xsl:template>
<xsl:template match="IMG">
<xsl:element name="img">
        <xsl:attribute name="src"><xsl:value-of select="@src"/></xsl:attribute>
        <xsl:attribute name="style"><xsl:value-of select="@style"/></xsl:attribute>
        <xsl:attribute name="align"><xsl:value-of select="@align"/></xsl:attribute>
        <xsl:attribute name="hspace"><xsl:value-of select="@hspace"/></xsl:attribute>
        <xsl:attribute name="vspace"><xsl:value-of select="@vspace"/></xsl:attribute>
        <xsl:attribute name="border"><xsl:value-of select="@border"/></xsl:attribute>
        <xsl:attribute name="alt"><xsl:value-of select="@alt"/></xsl:attribute>
        <xsl:value-of select="."/>
</xsl:element>
</xsl:template>
<xsl:template match="HR"><hr/></xsl:template>
</xsl:stylesheet>
```

Source code for XSL Bottom (130)

FIGURE 16

| Name | | examples of converting source |
|---|---|---|
| Input Box | HTM | <INPUT name=root/main/personalInfo/name value="'"> |
| | XSL | <xsl:value-of select="root/main/personalInfo/name"/> |
| Teaxtarea | HTM | <TEXTAREA name=root/main/personalInfo/address><br></TEXTAREA> |
| | XSL | <xsl:apply-templates select="root/main/personalInfo/address"/> |

FIGURE 17

| Name | | examples of converting source |
|---|---|---|
| Checkbox | HTM | <INPUT name=root/contents/personalInfo/useLanguage value=html-css type=checkbox>HTML<br><INPUT name=root/contents/personalInfo/useLanguage value=js type=checkbox>Java |
| | XSL | <INPUT name="root/main/personalInfo/useLanguage" value="html-css" type="checkbox"/><br>HTML&CSS   <br><INPUT name="root/main/personalInfo/useLanguage" value="js" type="checkbox"/><br>Java Script    <br>add Javascript<br>bxfSetValCheckBox("root/main/personalInfo/useLanguage", "<xsl:value-of select="root/main/personalInfo/useLanguage"/>"); |

FIGURE 18

| Name | | examples of converting source |
|---|---|---|
| Radio Button | HTM | <INPUT name=root/contents/personalInfo/gender value=male type=radio>male<br><INPUT name=root/contents/personalInfo/gender value=female type=radio>female |
| | XSL | <INPUT name="root/main/personalInfo/gender" value="man" type="radio"/>male<br><INPUT name="root/main/personalInfo/gender" value="woman" type="radio"/>female<br>add Javascript<br>bxfSetValRadioBtn("root/main/personalInfo/gender", "<xsl:value-of select="root/main/personalInfo/gender"/>"); |

FIGURE 19

| Name | | examples of converting source |
|---|---|---|
| Select Box | HTM | `<SELECT name=root/contents/personalInfo/useXML>`<br>`<OPTION selected value=none>nothing </OPTION>`<br>`<OPTION value=low>beginner's level</OPTION>`<br>`<OPTION value=middle>experience in development</OPTION>`<br>`<OPTION value=high>professional level</OPTION>`<br>`</SELECT>` |
| | XSL | `<SELECT name="root/main/personalInfo/useXML">`<br>`<OPTION selected="selected" value="none">nothing </OPTION>`<br>`<OPTION value="low">beginner's level</OPTION>`<br>`<OPTION value="middle">experience in development</OPTION>`<br>`<OPTION value="high">professional level</OPTION>`<br>`</SELECT>`<br>add Javascript:<br>`bxfSetValComboBox("root/main/personalInfo/useXML"','<xsl:value-of select="root/main/personalInfo/useXML"/>');` |

FIGURE 20

| Name | | examples of converting source |
|---|---|---|
| Repeat Table | HTM | `<TR>`<br>`<TD><INPUT onfocus=this.blur() name=rowcheck_1 type=checkbox></TD>`<br>`<TD>`<br>`<INPUT style="BORDER-BOTTOM: black 1px solid; BORDER-LEFT: black 1px solid; BORDER-TOP: black 1px solid; BORDER-RIGHT: black 1px solid" name=LIST_root/contents/familyInfo/relation size=3>`<br>`</TD>` |
| | XSL | `<xsl:for-each select="root/main/familyInfo">`<br>`<TR>`<br>`<TD><INPUT readonly="true" style="BORDER:0;display:none" onfocus="this.blur()" name="rowcheck_1" type="checkbox"/></TD>`<br>`<TD><xsl:value-of select="relation"/></TD>`<br>`<TD><xsl:value-of select="lastName"/></TD>`<br>`</TR>`<br>`</xsl:for-each>` |

METHOD OF IMPLEMENTING STRUCTURED AND NON-STRUCTURED DATA IN AN XML DOCUMENT

CROSS-REFERENCE TO RELATED APPLICATION

This application is the Section 371 National Stage of PCT/KR2013/003672 filed Apr. 29, 2013, the entirety of which is incorporated herein by reference to the extent permitted by law. This application claims the benefit of priority to Korean Patent Application No. KR 10-2012-0075954, filed Jul. 12, 2012 the entirety of which is incorporated herein by reference to the extent permitted by law.

BACKGROUND OF THE INVENTION

The present invention relates, in general, to a method of implementing structured and non-structured data in an XML document and, more particularly, to a method of implementing both structured data stored in a database and non-structured data stored in a legacy document in an XML document using XML replacement technology.

Internet interconnects many communication networks around the world, and computers connected to the Internet use a communication protocol called Transmission Control Protocol/Internet Protocol (TCP/IP) to communicate to each other.

Also, Hyper Text Markup Language (HTML) is one of data formats used on World Wide Web (WWW) and is a method of writing a hypermedia document. In other words, HTML defines a logical structure of hypertext using a standard document format called Standard Generalized Markup Language (SGML), and HTML is stored as a text file format.

To see a specific web page using a web browser such as Internet Explorer, a user has to input an address of Uniform Resource Locator (URL) of the web page. Accordingly, if the user does not know the address of URL of the web page, it is difficult to access the target document.

Consequently, software is needed to enable a user to search for any desired information among a huge amount of information on the Internet even if the user does not know the URL of each Internet site, and the software is called a search engine.

A search engine operates as follows. A search robot or a prescribed program that is called a spider program browses through multiple sites on the Internet, and stores information, previously collected from the web sites, on a database. When a user inputs a specific search word, a web site where contents corresponding to the search words are stored is selected and displayed. More specifically, when receiving a search request through keyword input from a user computer, the search engine operates a spider program through Common Gateway Interface (CGI).

CGI is a standard interface between an external program and a web server, which receives a data from a web browser installed in a user's computer as input; runs an external program according to the input data; and receives results from the execution of the external program. The operated spider program receives search results from an index database storing addresses of URL, information of various websites, and the like; converts the search results into HTML format; and transmits the converted HTML documents to the user's computer.

In the beginning of the Internet service, at the search engine side, both Internet sites and web documents were retrieved and classified, and a database was constructed using the classified data. Accordingly, when searching for specific data, these search engines used a directory search method that approaches the specific data by subdividing subject classification, which was previously configured according to a user's subject search or user's menu search.

However, rapid growth in the size of the World Wide Web (WWW) led to a sudden increase in the number of Internet sites, and thus it is not easy to effectively search for desired information using the directory search method. In other words, in accordance with the rapid growth in the size of the WWW, search engines have to expand data amount. However, the method of the existing search engines, that is, checking a web page and storing data from the web page into a database manually, may not correspond with the growth of WWW.

Consequently, search engines introducing the above mentioned search robot, which provides search service by retrieving and indexing a web page automatically, are developed. These search engines use a keyword (search word) search method. In other words, these search engines search for every web document related to the search word that a user inputs, and provide it to the user's computer. However, the amount of the web pages is so large that the user has to search for the desired content on a display of the search results once again.

On the other hand, XML, an acronym of eXtensible Markup Language, is a next generation Internet document standard that is essentially used in the Internet era. World Wide Web Consortium (W3C) defined XML as an Internet standard document in 1998. The structure of XML is easily understandable by people and easily manageable by machines. Also, XML resolves limitations of HTML for representing Web content and overcomes shortcomings of SGML.

HTML that has been most widely used for representing content on the Internet is appropriate for data representation, but has a limitation in reusing or retrieving documents. Accordingly, to resolve this problem, XML gives attention as a next generation Internet language because XML facilitates the expandability, compatibility, and structuring of information.

On the other hand, information on the Internet is largely divided into structured data and non-structured data. Generally, structured data is stored in a database while non-structured data is stored in a legacy document.

In this case, non-structured data stored in the legacy document is not easy to retrieve compared to structured data in a database. Furthermore, to view the legacy document, as the legacy document should be downloaded to a client computer, a space for storing the document and a dedicated viewer for the document are required.

For example, a method for searching data in the Internet and making a database with the data, applied for Korean Patent Application Publication No. 10-1998-0006152, discloses that a database is separately constructed for a specific field of data and a commercial retrieval service is available using the database. Also, a web browsing system and a web browsing method with adding links data on HTML document based on user's request, applied for Korean Patent Application Publication No. 10-2008-0015282, discloses that user can conveniently and effectively browse and search the Web by selectively adding a link data on an HTML document, which is received from a specific web server by a user's request and is interpreted by a web browser. However, as the above applications convert search results into HTML format and transmit the HTML documents to a user's computer, speed of retrieving data is slowed down. Also, if error occurs during the process of receiving the search results and in the process of converting them into HTML format, inaccurate search results may be displayed and non-structured data may not be stored.

SUMMARY OF THE INVENTION

Accordingly, the present invention has been made keeping in mind the above problems, and an object of the present invention is to provide a method of implementing structured and non-structured data in an XML document, which may quickly implement structured and non-structured data in a dynamic Well Formed XML (eXtensible Markup Language) document not using Document Object Model (DOM) but using XML replacement technology.

In order to accomplish the above object, a method of implementing structured and non-structured data in an XML document according to the present invention includes: designing a source HTML document that contains a form tag; designing a structured source XML document using a user-defined tag; designing a web form document by mapping an absolute path variable of the user-defined tag into the source HTML document; automatically creating an XSL document by XSLT-processing the web form document; inputting structured and non-structured data into the web form document; automatically creating a new XML document by replacing the absolute path variable of the user-defined tag with the structured and non-structured data input in the web form document; and automatically displaying content of the new XML document by merging the new XML document and the XSL document.

Also, in designing the source HTML document, the form tag is an empty form in which data is not contained.

Also, in designing the structured source XML document, using an XML tree structure, the source XML document stores the absolute path variable of the user-defined tag as a user-defined tag value.

Also, in designing the structured source XML document, when writing general data and repeated data, which are structured data of the source XML document, in a user-defined tag value, each type of data is written in different notation in order to distinguish the general data and the repeated data.

Also, in designing the structured source XML document, when structured data of the source XML document is repeated data, the repeated data is written using an attribute in the user-defined tag of the source XML document.

Also, in designing the web form document, the web form document is designed by mapping the absolute path variable of the user-defined tag into the form tag as a data format is designated to the form tag.

Also, designing the web form document includes: a structured data form tag design process for designing a structured data form tag that is mapped into the absolute path variable of the user-defined tag and receives the structured data as input; and a non-structured data form tag design process for designing a non-structured data form tag that is mapped into the absolute path variable of the user-defined tag and receives the non-structured data as input.

Also, in automatically creating the XSL document, the XSL document is connected to the web form document through the absolute path variable of the user-defined tag.

Also, in automatically creating the XSL document, the XSL document is automatically created by an automatic tool for generating an XSL document, which is run on a computer system, when the web form document is saved.

Also, in automatically creating the new XML document, the new XML document is automatically created by an automatic generation engine of XML document, which is run on a server, when structured data and non-structured data is input and stored into the web form document.

Also, automatically creating the new XML document includes: a data substitution format setting process for setting a data substitution format by calculating a substitution value of the structured and non-structured data; a data mapping process for mapping the calculated substitution value of the structured and non-structured data into a value of the absolute path variable of the source XML document; and a new XML document creating process for creating a new XML document by saving the XML source document as the new XML document after replacing the value of the absolute path variable of the source XML document with the calculated substitution value of the structured and non-structured data.

Also, in the data substitution format setting process, the data substitution format includes a structured data substitution format and a non-structured data substitution format, and the structured data substitution format or the non-structured data substitution format includes a general data substitution format and a repeated data substitution format.

Also, in the data substitution format setting process, the data substitution format includes a variable separator, which is in between the absolute path variable of the user defined tag and a value of the absolute path variable, for distinguishing the absolute path variable from the value of the absolute path variable.

Also, in the data substitution format setting process, the value of the absolute path variable is the calculated substitution value of the structured and non-structured data.

Also, in the data substitution format setting process, the data substitution format includes a line separator at the end of the value of the absolute path variable for separating lines.

As described above, a method of implementing structured and non-structured data in an XML document according to the present invention may quickly implement structured and non-structured data in a dynamic Well Formed XML (eXtensible Markup Language) document not using DOM but using XML replacement technology.

Also, an XML document created according to the present invention facilitates searching for structured and non-structured data and may be directly displayed on a web browser. Therefore, a storage space on a client side and a dedicated viewer are not required.

Also, as an XML document created according to the present invention has a small size, a waste of electricity may be reduced, download time may be decreased, and Internet traffic may be reduced.

Additionally, if a W3C standard XML document created according to the present invention is stored in a server on the Internet, for example, in the middleware, it may be directly served to various devices (PC, Tablet PC, Smart Phone, Smart TV, etc) and may be applied to implement cloud computing for N-Screen.

BRIEF DESCRIPTION OF DRAWINGS

FIG. 7 is a view illustrating a web form document according to the present invention;

FIG. 8 is a view illustrating a data format of and a source of a form tag in a web form document;

FIG. 12 is a view illustrating a source code of XSL Head of an XSL document according to the present invention;

FIG. 13 is a view illustrating a source code of XSL Body of an XSL document according to the present invention;

FIG. 14 is a view illustrating a source code of XSL Bottom of an XSL document according to the present invention;

FIGS. 16 to 20 are views illustrating an example of converting a source of a web form document illustrated in FIG. 7;

DESCRIPTION OF THE REFERENCE NUMERALS IN THE DRAWINGS

Figure 1:
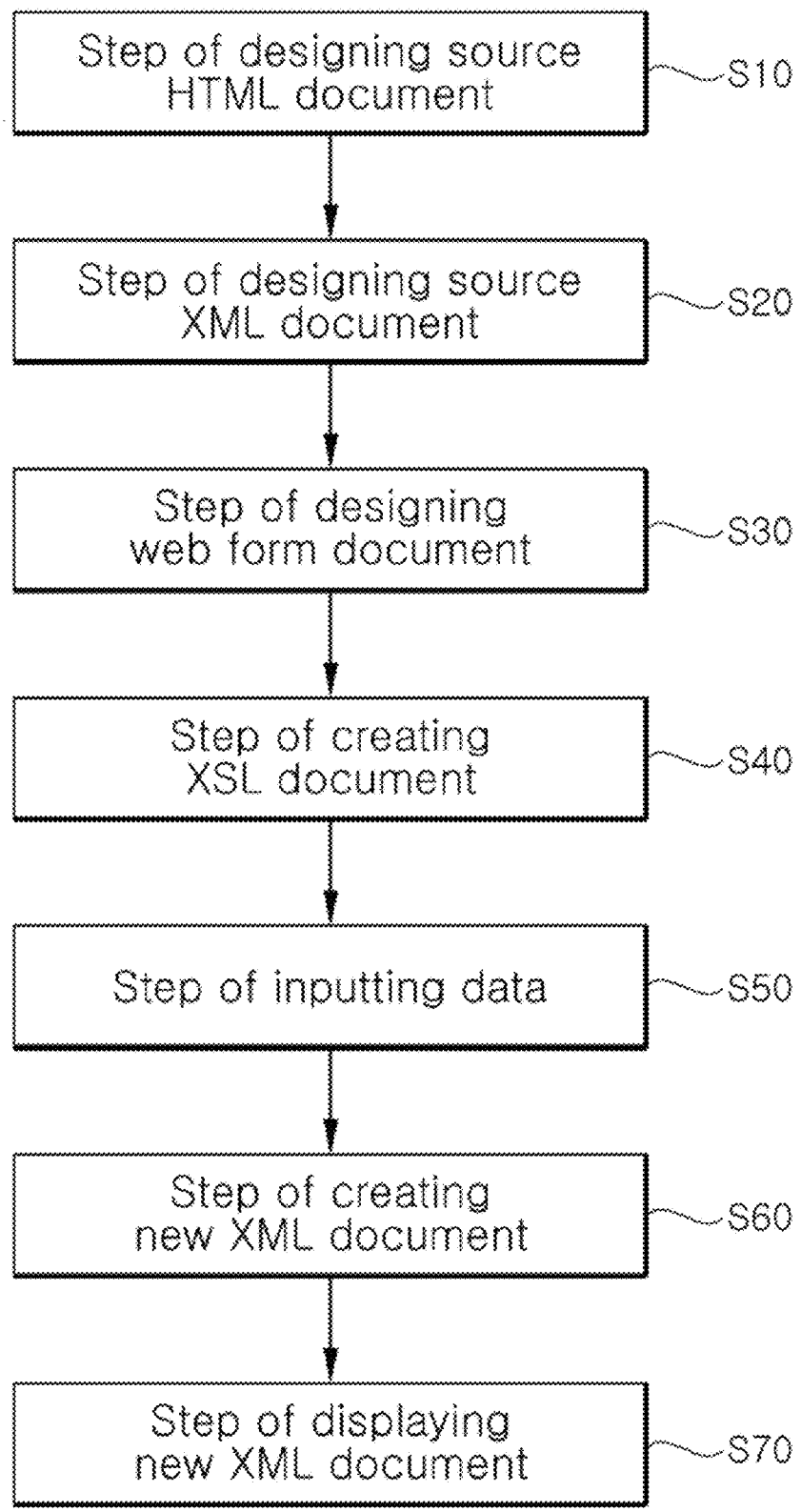
FIG. 1 is a block diagram of a method of implementing structured and non-structured data in an XML document according to the present invention.

S10: step of designing source HTML document
S20: step of designing source XML document
S30: step of designing web form document
S31: structured data form tag design process
S32: non-structured data form tag design process
S40: step of creating XSL document
S50: step of inputting data
S60: step of creating new XML document
S61: data substitution format setting process
S62: data mapping process
S63: new XML document creating process
S70: step of displaying new XML document

DETAILED DESCRIPTION OF THE PRESENTLY PREFERRED EMBODIMENTS

Hereinafter, exemplary embodiments of the present invention will be described in detail referring to accompanying drawings. Reference should now be made to the drawings, in which the same reference numerals are used throughout the different drawings to designate the same or similar components. To prevent the present invention from getting vaguer in describing the present invention, detailed description of structures or functions known to the public shall be omitted.

Figure 4:
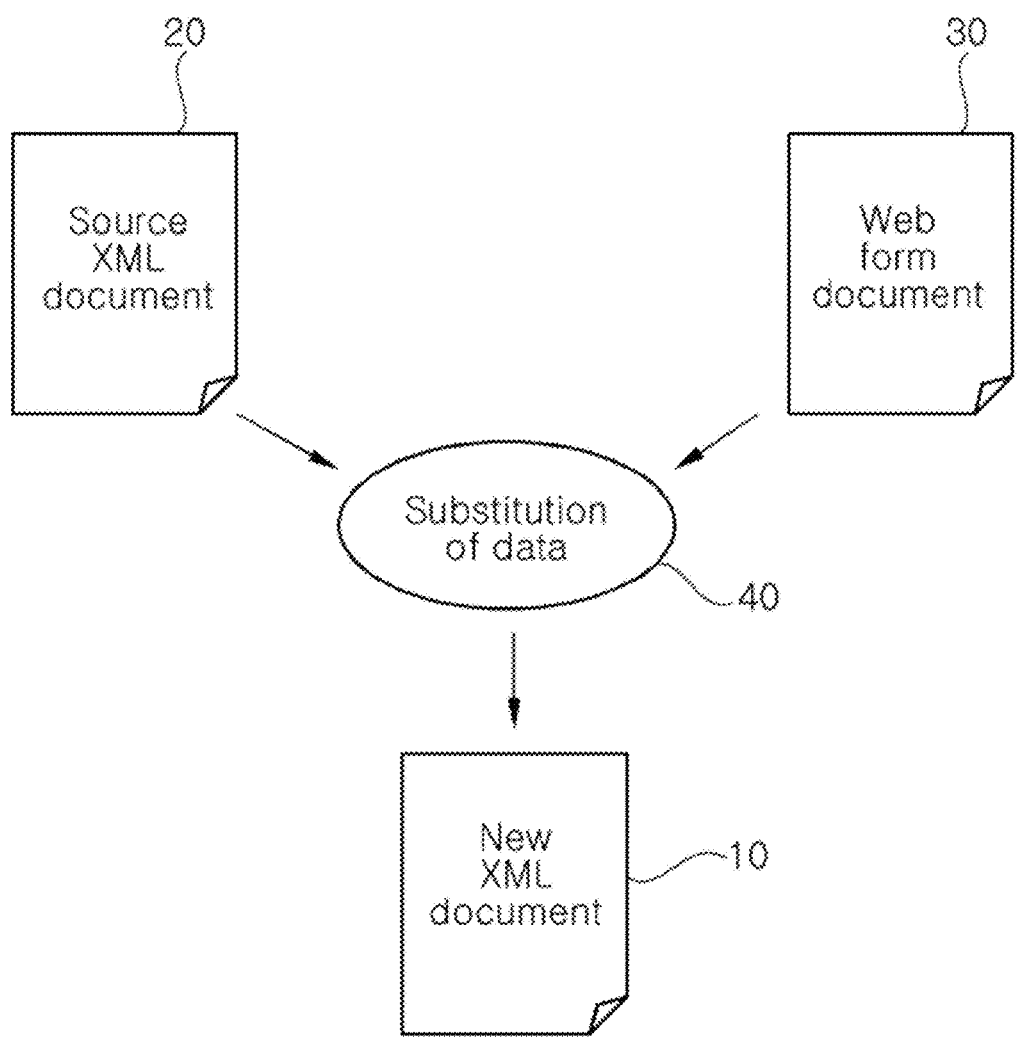
FIG. 4 is a schematic view illustrating creating a new XML document by replacing a source XML document with structured and non-structured data.

FIG. 4 is a schematic view illustrating creating a new XML document 10 by replacing a source XML document 20 with structured and non-structured data from a web form document 30 using a substitution of data process 40.

As shown in FIG. 4, the present invention relates to technology of implementing both structured data that is stored in a database, for example web form document 30, and non-structured data that is stored in legacy documents, for example, stored in PDF, DOC, PPT documents, etc., e.g. source document 10 in a dynamic Well Formed XML (eXtensible Markup Language) document 10 using XML replacement technology. More specifically, the present invention relates to a method of implementing the structured and non-structured data in a well formed XML document by replacing an absolute path variable of a user-defined tag in the XML document with a substitution value of the structured and non-structured data.

The present invention may quickly create a new XML document 10 by a process of receiving structured and non-structured data as input from a user through a previously designed web form document 30, and replacing the data by mapping the structured and non-structured data into a previously defined source XML document 20. In this case, the new XML document 10 may be created by an automatic generation engine of XML document, which is run when the user inputs and stores the structured and non-structured data into the web form document 30.

FIG. 1 is a block diagram of a method of implementing structured and non-structured data in an XML document according to the present invention.

As illustrated in FIG. 1, a method of implementing structured and non-structured data in an XML document according to the present invention includes a step S10 of designing a source HTML document; a step S20 of designing a source XML document; a step S30 of designing a web form document; a step S40 of creating an XSL document; a step S50 of inputting data; a step S60 of creating a new XML document; and a step S70 of displaying a new XML document.

Figure 2:
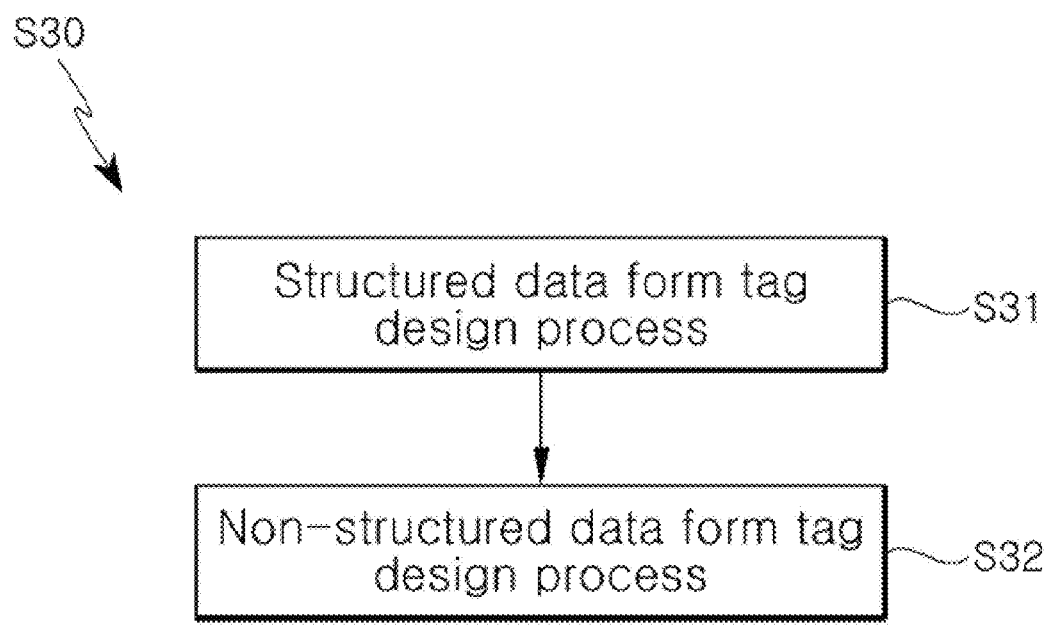
FIG. 2 is a block diagram of a step of designing a web form document according to the present invention.

FIG. 2 is a block diagram of steps of designing a web form document according to the present invention.

Specifically, as illustrated in FIG. 2, the step S30 of designing a web form document may include a structured data form tag design process S31 and a non-structured data form tag design process S32.

The structured data form tag design process S31 is a process for designing structured data form tags that receive structured data as input, and the structured data form tags may be mapped into the absolute path variables of the user-defined tags defined in the source XML document 20.

Figure 3:
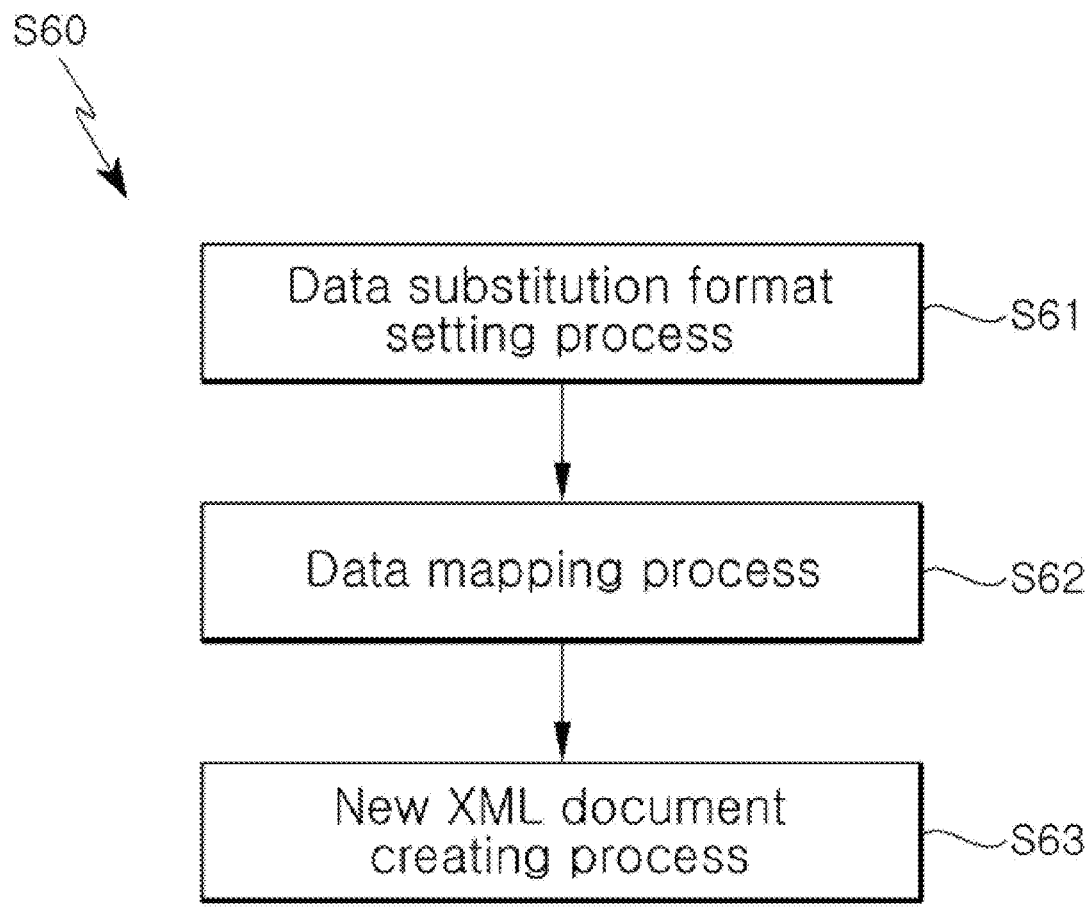
FIG. 3 is a block diagram of a step of creating a new XML document according to the present invention.

FIG. 3 is a block diagram of a step S60 of creating a new XML document 10 according to the present invention.

As shown in FIG. 3, the step S60 of creating a new XML document may include a data substitution format setting process S61, a data mapping process S62, and a new XML document creating process S63.

The data substitution format setting process S61 is a process for setting a data substitution format by calculating data substitution values for the structured and non-structured data that is input into the web form document 30.

Figure 5:
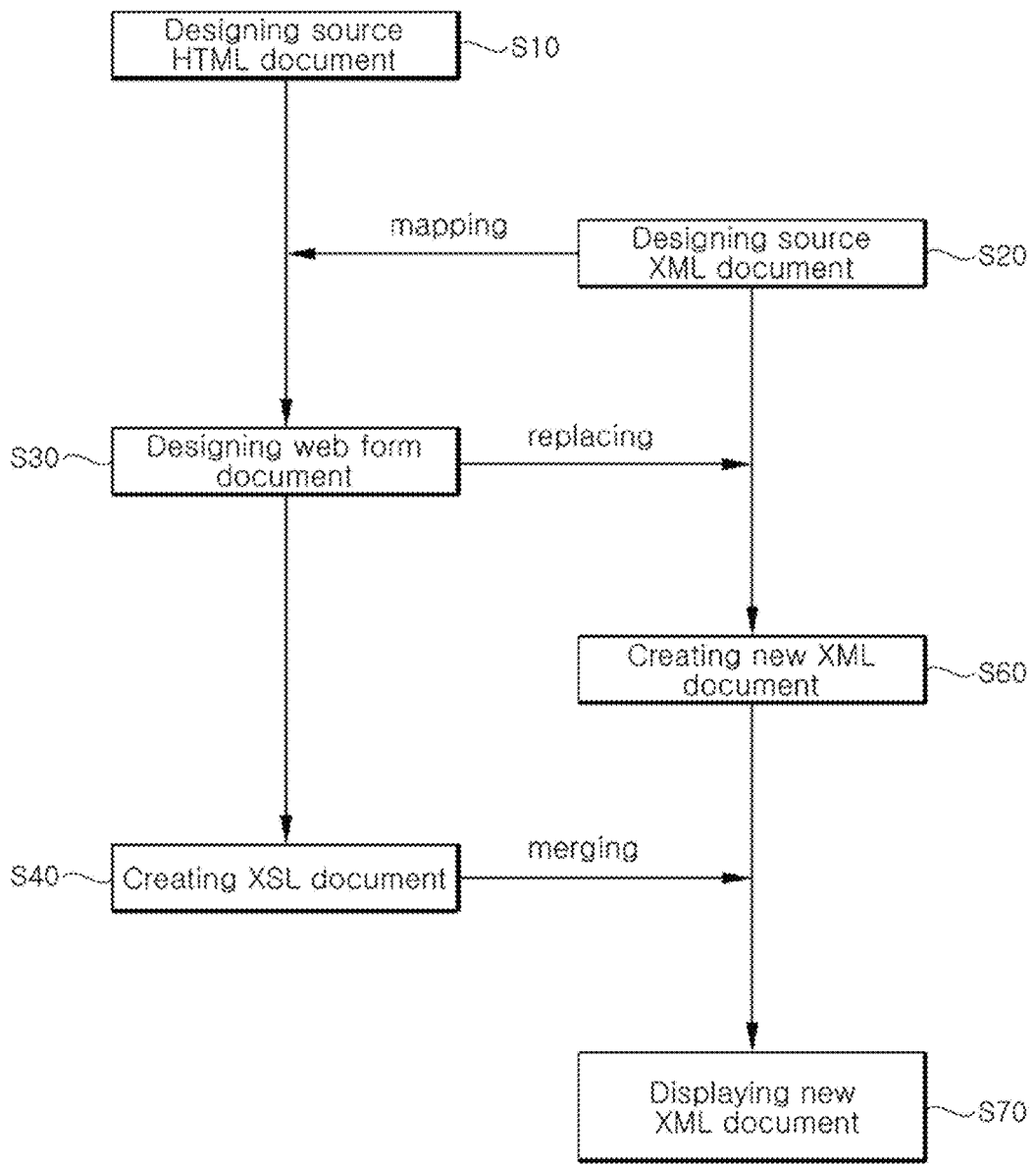
FIG. 5 is a schematic view illustrating a method of implementing structured and non-structured data in an XML document according to the present invention.

FIG. 5 is a schematic view illustrating a method of implementing structured and non-structured data in an XML document according to the present invention.

As shown in FIG. 5, the step S10 of designing a source HTML document is a step for designing a source HTML document with a form tag that is an input field for receiving structured and non-structured data as input from a user.

The step S10 of designing a source HTML document is a step for designing an empty form of HTML document without data, and specifically, a form tag of the source HTML document has a format in which data is not included. In the step S30 of designing a web form document that will be described later, the well formed data format may be designated to the form tag.

Concretely, the source HTML document 30 may be designed using Xstyler tool 1000 (see FIGS. 9 and 10) run on the computer system. In the present invention, the Xstyler tool 1000 may be used to design not only the source HTML document 30 but a source XML document 20 and a web form document 30 that will be described below. Also, the Xstyler tool 1000 may function as an automatic tool for generating an XSL document 100, which automatically creates an XSL document by XSLT-processing the web form document.

The step S20 of designing an XML source document is a step for designing a structured source XML document 20 using user-defined tags.

In the step S20 of designing an XML source document, the XML document 20 may store absolute path variables of the user-defined tags as user-defined tag values using an XML tree structure.

As shown in FIG. 5, the step S30 of designing a web form document is a step for designing a web form document 30 by mapping the absolute path variables of the user-defined tags, which are defined in the source XML document 20, to the source HTML document.

In this case, the web form document 30 is an HTML document in which the absolute path variables of the user defined tags are mapped with the form tags of the source HTML document by designating data formats to the form tags, and the web form document 30 may receive structured formal data and repeated non-structured data as input through the form tags.

As shown in FIG. 5, the step S40 of creating an XSL document is a step for automatically creating an XSL document 100 by converting the web form document 30 using eXtensible Stylesheet Language Transformations (XSLT).

In this case, the XSL document 100 may be connected to the web form document 30 through the absolute path variables of the user-defined tags. As described above, the XSL document 100 may be automatically created by Xstyler tool 1000 that is an automatic tool for generating an XSL document, which is operated on the computer system when a user saves the designed web form document.

The step S50 of inputting data is a step for inputting structured and non-structured data into the web form document.

Concretely, in the step S50 of inputting data, the web form document can be opened on a web browser, and a user may input structured data and non-structured data into a structured data form tag and non-structured data form tag in the web form document, respectively, to create a new XML document 10.

As shown in FIG. 5, the step S60 of creating a new XML document is a step for automatically creating a new XML document 10 by converting the absolute path variables of the user-defined tags into the structured and non-structured data that are input to the web form document.

In the step S60 of creating a new XML document, the new XML document 10 may be automatically created by an automatic generation engine of XML document run on the server when a user inputs and stores the structured and non-structured data into the web form document 30 on the web browser. In this case, the automatic generation engine of XML document may be also run on the computer system that the user uses.

As shown in FIG. 5, the step S70 of displaying a new XML document is a step for automatically displaying the content of the new XML document 10 by merging the new XML document and the XSL document 100.

In other words, in the step S70 of displaying a new XML document, the content of the new XML document 10 may be displayed in a form of various HTML documents including a web form document by merging the new XML document 10 created in the step S60 of creating a new XML document and the XSL document 100 created in the step S40 of creating an XSL document. In this case, non-structured data included in the new XML document 10 may be converted using a conversion rule, and then displayed as the content of the HTML document.

Figure 6:
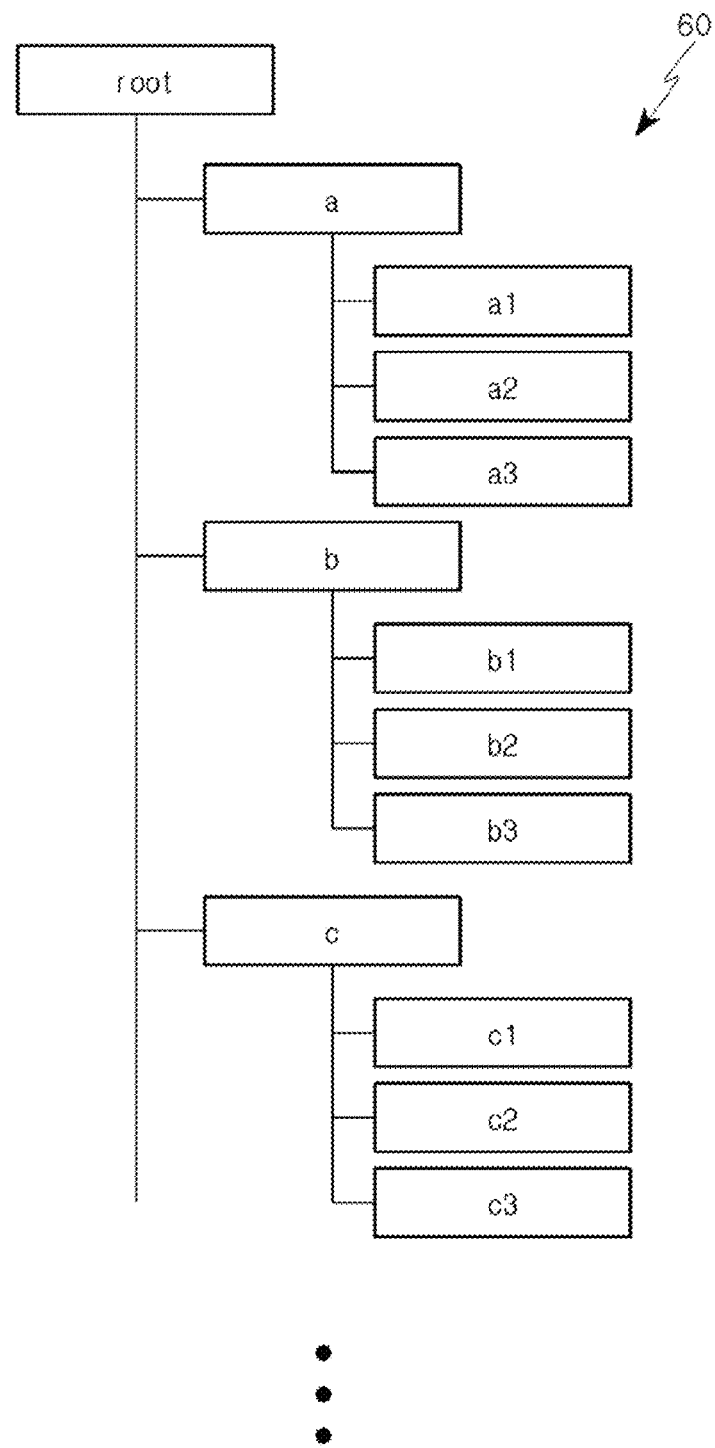
FIG. 6 is a view illustrating a data structure of a source XML document according to the present invention.

FIG. 6 is a view illustrating a data structure 60 of a source XML document according to the present invention.

Specifically, in the step S20 of designing an XML source document, the following XML document may be created from a source XML document 20 that has a structure illustrated in FIG. 6. In this case, tags (a, b, c) with a child do not have absolute path variables, while tags (a1, a2, a3, b1, b2, b3, c1, c2, c3) without a child may have absolute path variables.

```
<root>
   <a>
      <a1>H_root/a/a1</a1>
      <a2>H_root/a/a2</a2>
      <a3>H_root/a/a3</a3>
   </a>
   <b>
      <b1>H_root/a/b1</b1>
      <b2>H_root/a/b2</b2>
      <b3>H_root/a/b3</b3>
   </b>
   <c>
      <c1>H_LIST_root/a/c1</c1>
      <c2>H_LIST_root/a/c2</c2>
      <c3>H_LIST_root/a/c3</c3>
   </c>
</root>
```

When designing the source XML document 20, if general data and repeated data, which are structured data of the source XML document 20, are written in the user-defined tag values, each type of data may be written in different notation in order to distinguish the general data and repeated data.

Specifically, when writing the general data and repeated data in the user-defined tag values, it is desirable that the general data is written in "H" and the repeated data is written in "H_LIST".

Also, when the structured data of the source XML document 20 is repeated data, the repeated data may be written using an attribute in the user-defined tags of the source XML document 20.

Concretely, in the step S20 of designing a source XML document, when defining user-defined tags of the source XML document 20, it is desirable that the repeated data is written using an attribute, "repeat=y" to distinguish it from general data.

As described above, the following [Table 1] illustrates an example of the user-defined tag and tag values according to the data type of the source XML document 20 defined in the step S20 of designing a source XML document.

TABLE 1

| Data type | Division | Tag | Tag Value |
|---|---|---|---|
| General data | | <a1> | H_root/a1 |
| Repeated data | repeat = "y" | <c1 repeat = "y"> | H_LIST_root/c/c1 |

As shown in FIG. 5, the step S30 of designing a web form document is a step for designing a web form document 30 by mapping the absolute path variables of the user-defined tags, which are defined in the source XML document 20, to the source HTML document 30.

In this case, the web form document 30 is an HTML document in which the absolute path variables of the user defined tags are mapped with the form tags of the source HTML document by designating data formats to the form tags, and the web form document 30 may receive structured formal data and repeated non-structured data as input through the form tags.

FIG. 7 is a view illustrating a web form document 30 according to the present invention, and FIG. 8 is a view illustrating a data format 80 of and a source of a form tag 82 in a web form document 30.

In the structured data form tag design process S31, data types of the form tags in the source HTML document 30 may be variously set.

For example, when the web form document 30 is designed to have a structure illustrated in FIG. 7, the form tags 82 may be set to have data types of "Input Box", "Teaxtarea", "Checkbox", "Radio Button", "Select Box", and "Repeat Table" as illustrated in FIG. 8. In this case, the user-defined tag values mapped with the form tags of the web form document illustrated in FIG. 7 are as follows:

```
<root>
<contents>
    <personalInfo>
        <name>H_root/contents/personalInfo/name</name>
        <gender>H_root/contents/personalInfo/gender</gender>
        <birthday>H_root/contents/personalInfo/birthday</birthday>
        <telephone>H_root/contents/personalInfo/telephone</telephone>
        <eMail>H_root/contents/personalInfo/eMail</eMail>
        <address>H_root/contents/personalInfo/address</address>
        <career>H_root/contents/personalInfo/career</career>
        <useXML>H_root/contents/personalInfo/useXML</useXML>
        <useLanguage>H_root/contents/personalInfo/useLanguage</useLanguage>
        <memo>H_root/contents/personalInfo/memo</memo>
        <photo>H_root/contents/personalInfo/photo</photo>
    </personalInfo>
    <familyInfo>
        <relation repeat="y">H_LIST_root/contents/familyInfo/relation</relation>
        <lastName repeat="y">H_LIST_root/contents/familyInfo/lastName</lastName>
        <age repeat="y">H_LIST_root/contents/familyInfo/age</age>
        <job repeat="y">H_LIST_root/contents/familyInfo/job</job>
        <memo repeat="y">H_LIST_root/contents/familyInfo/memo</memo>
    </familyInfo>
</contents>
</root>
```

The non-structured data form tag design process S32 is a process for designing non-structured data form tags that receive non-structured data as input, and the non-structured data form tags may be mapped into the absolute path variables of the user-defined tags defined in the source XML document 20.

Repeated non-structured data, which is input through the non-structured data form tags in the step S50 of inputting data that will be described later, may be converted by a converting rule and stored in the user-defined tag values of the source XML document.

The following [Table 2] illustrates a converting rule for converting non-structured data, which is input to a web form document, to be stored in XML tags.

TABLE 2

| HTML | XML Tag |
|---|---|
| < | < |
| > | > |
| < | &lt; |
| > | &gt; |
| & | & |
|   |   |

As shown in FIG. 5, the step S40 of creating an XSL document is a step for automatically creating an XSL document 100 by XSLT-processing the web form document 30.

In this case, the XSL document may be connected to the web form document 30 through the absolute path variables of the user-defined tags. As described above, the XSL document 100 may be automatically created by Xstyler tool that is an automatic tool for generating an XSL document, which is operated on the computer system when a user saves the designed web form document 30.

Figure 9:
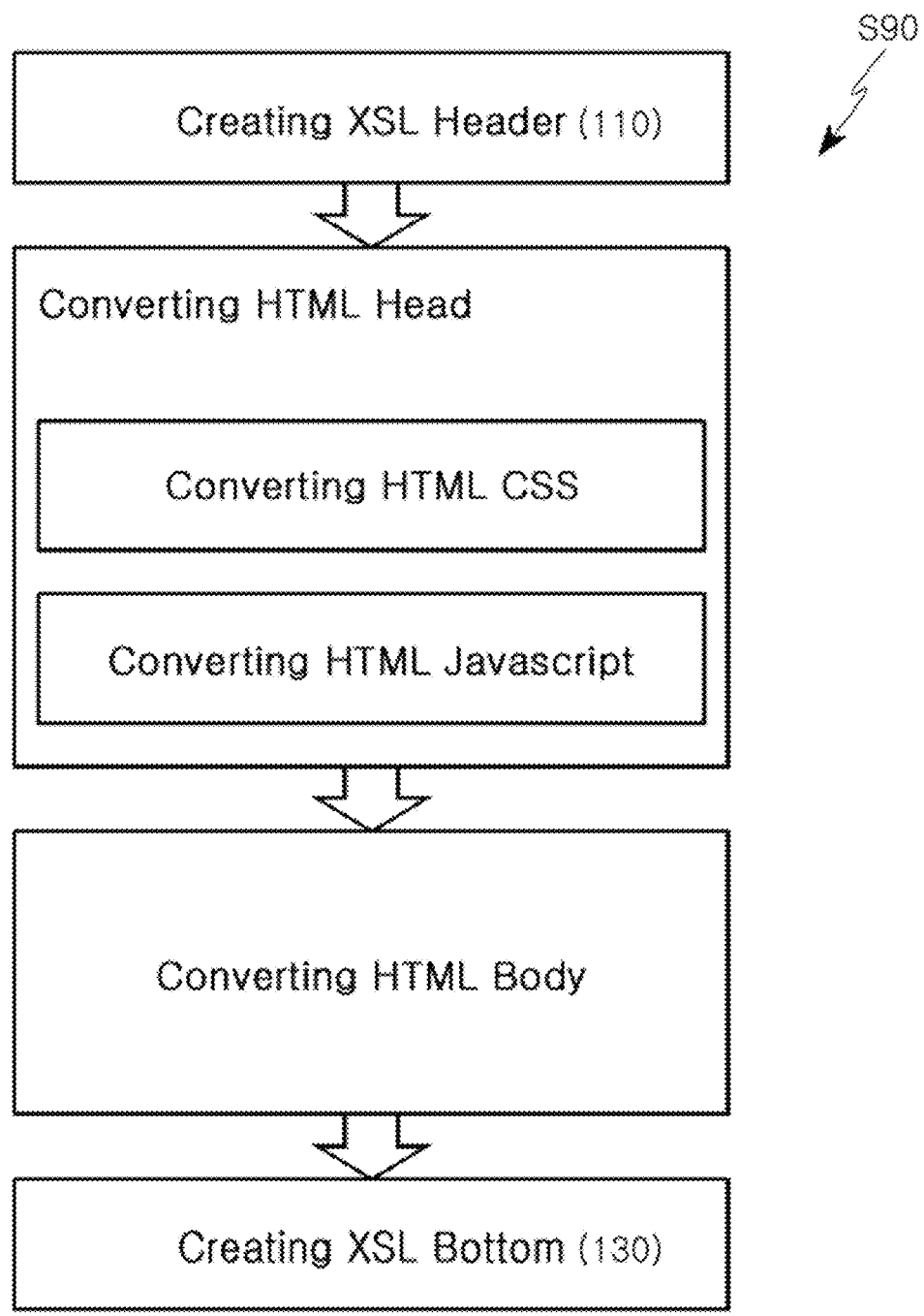
FIG. 9 is a view illustrating a process of converting a web form document into an XSL document.

FIG. 9 is a view illustrating a process S90 of converting a web form document 30 into an XSL document 100.

Specifically, as shown in FIG. 9, when XSLT-processing the web form document 30, the automatic tool for generating an XSL document may automatically create the XSL document 100 by the process of creating XSL-Header 110; respectively converting Head and Body of the web form document; and creating XSL-Bottom 130.

Figure 10:
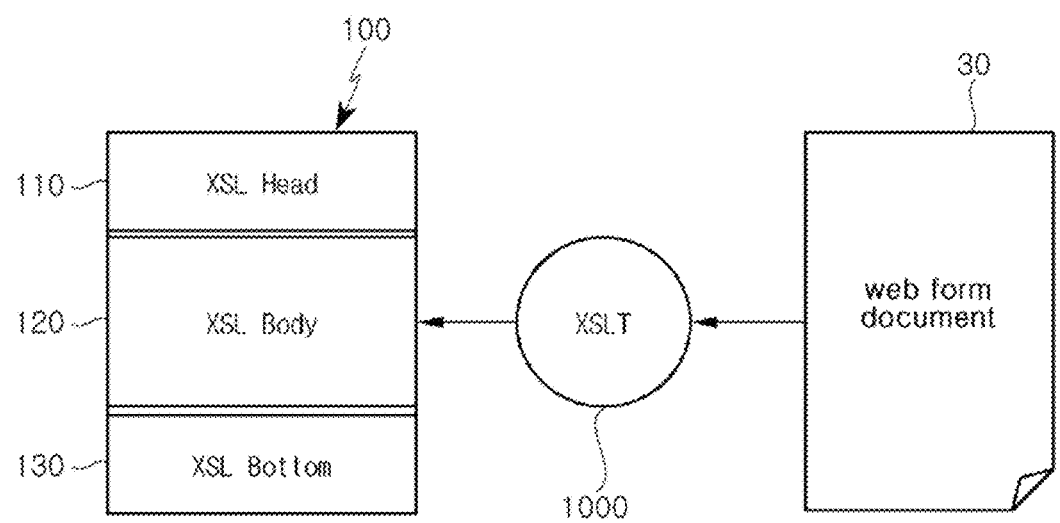
FIG. 10 is a view illustrating a structure of an XSL document according to the present invention.
Figure 11:
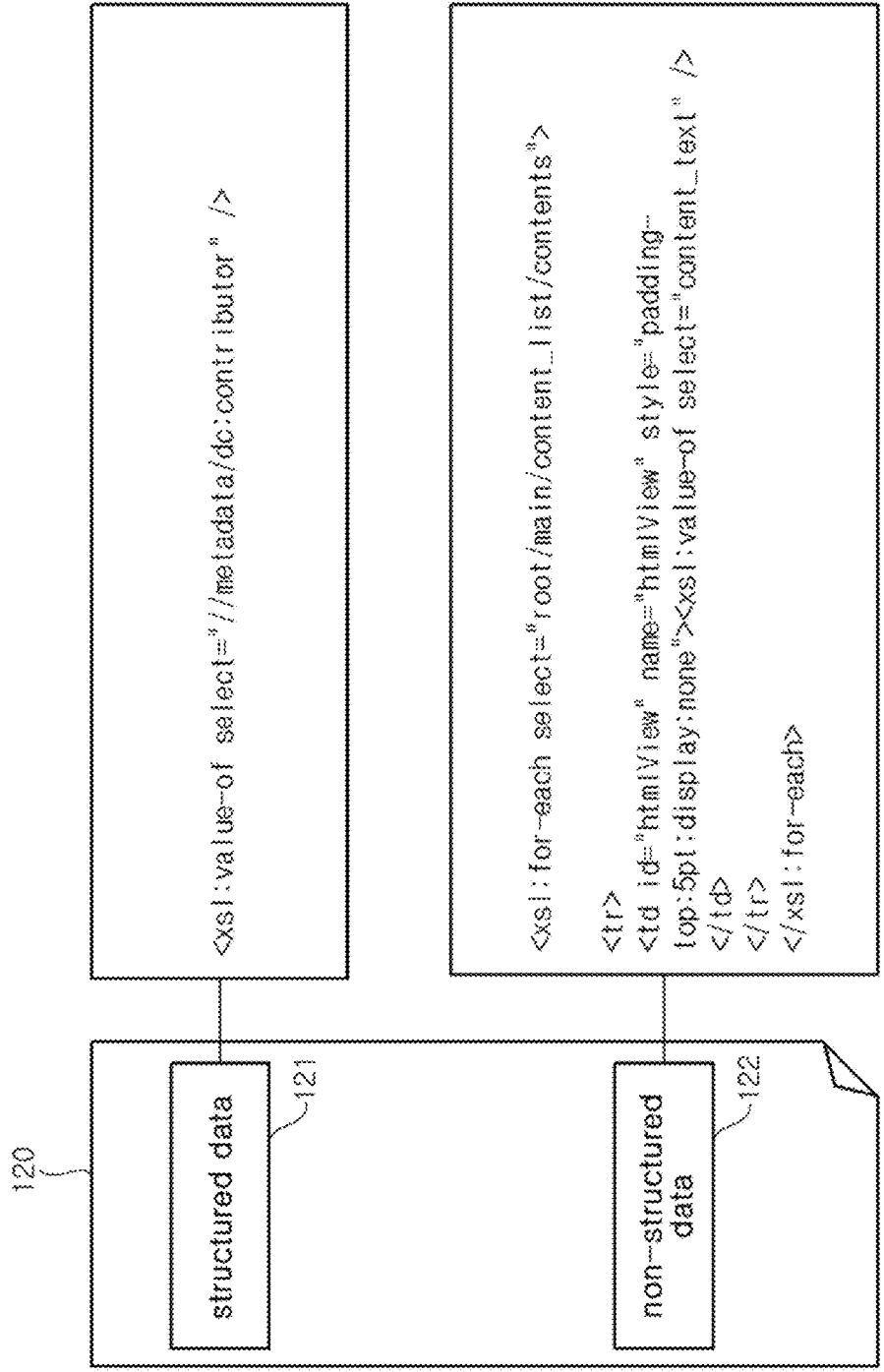
FIG. 11 is a view illustrating structured and non-structured data included in XSL body of FIG. 10.

FIG. 10 is a view illustrating a structure of an XSL document 100 according to the present invention, and FIG. 11 is a view illustrating structured and non-structured data included in XSL body 120 of FIG. 10. Also, FIG. 12 is a view illustrating a source code of XSL Head of an XSL document 100 according to the present invention; FIG. 13 is a view illustrating a source code of XSL Body 120 of an XSL document according to the present invention; and FIG. 14 is a view illustrating a source code of XSL Bottom 130 of an XSL document according to the present invention.

As illustrated in FIG. 10, an XSL document 100 created by the automatic tool for generating an XSL document may include XSL Head 110, XSL Body 120, and XSL Bottom 130. In this case, as shown in FIG. 11, the XSL Body 120 may include structured formal data 121 and repeated non-structured data 122. Also, the XSL Head 110, XSL Body 120, and XSL Bottom 130, which are included in the XSL document 100, may have a source code illustrated in FIGS. 12 to 14, respectively.

On the other hand, while creating an XSL document 100 by converting the web form document 30, the automatic tool for generating an XSL document may convert Self Close Tags, which are included in the source code of the web form document, using a converting rule.

The following [Table 3] illustrates a converting rule for converting Self Close Tags of a web form document.

TABLE 3

| HTML | XML Tag |
|---|---|
| <BR> | <BR/> |
| <LI> | <LI/> |
| <IMG . . . > | <IMG . . . /> |
| <EMBED . . . > | <EMBED . . . /> |
| <HR . . . > | <HR . . . /> |
| <INPUT . . . > | <INPUT . . . /> |
| <RARAM . . . > | <RARAM . . . /> |

TABLE 4

| Data | Division | Example |
|---|---|---|
| Structured | General | H__root/a/a1##^##formal__data__value\|\|^\|\| |
|  | Repeated | H__LIST__root/c/c1##^##formal__data__value\|\|^\|\| |
| Non-structured | General | H__root/a/a1##^##informal__data__value\|\|^\|\| |
|  | repeated | H__LIST__root/c/c1##^##informal__data__value\|^\|\| |

TABLE 5

| Type | Substitution value |
|---|---|
| Formal_data_value | John Kim |
| Informal_data_value | <TABLE border="1"><TR><TD>informal Data </TD></TR></TABLE> |

TABLE 3-continued

| HTML | XML Tag |
|---|---|
| <AREA . . . > | <AREA . . . /> |
| <LINK . . . > | <LINK . . . /> |
| <META . . . > | <META . . . /> |

Figure 15:
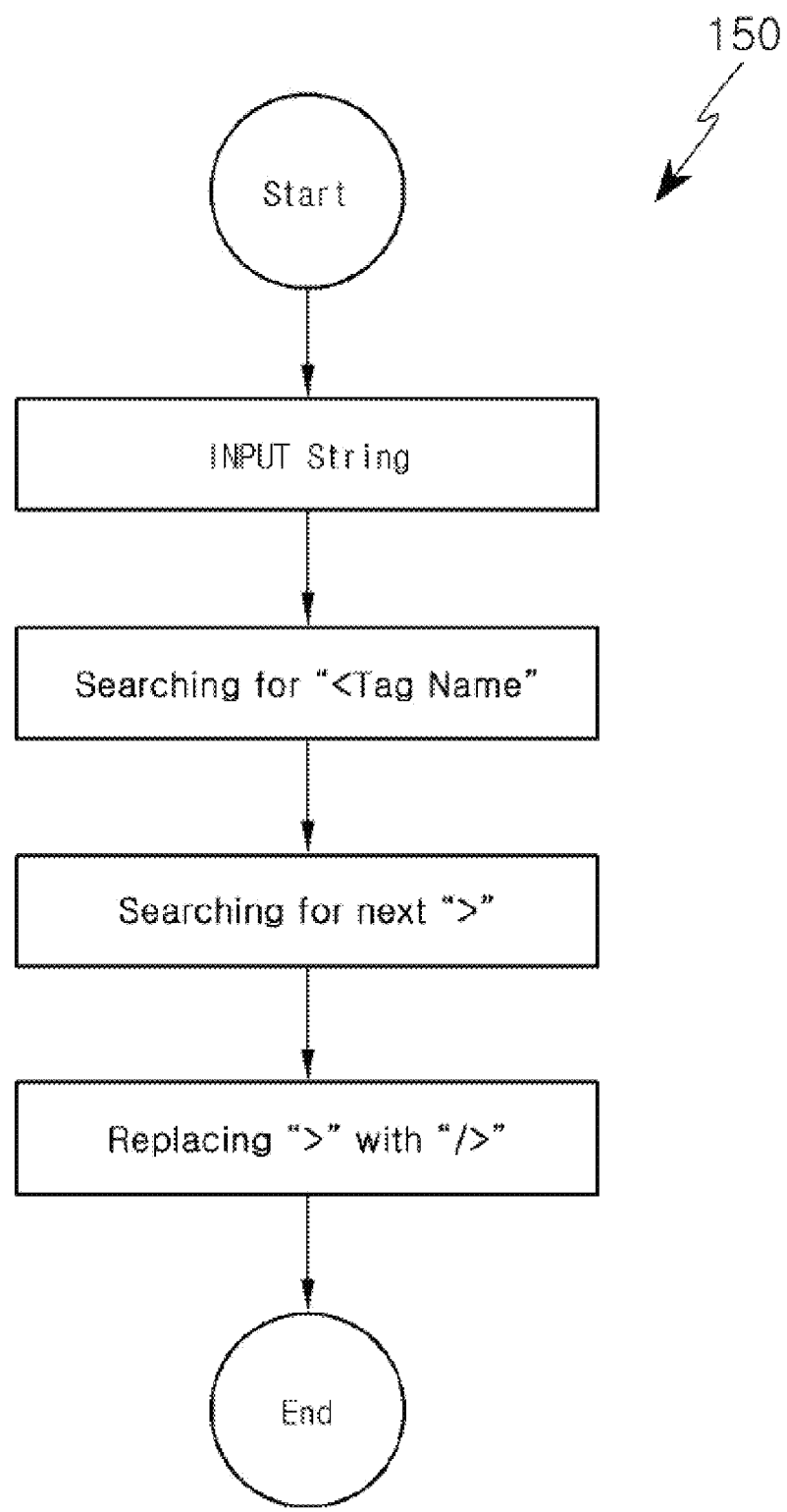
FIG. 15 is a view illustrating a process of converting Self Close Tag of a web form document according to the present invention.

FIG. 15 is a view illustrating a process 150 of converting Self Close Tag of a web form document according to the present invention, and FIGS. 16 to 20 are views illustrating an example of converting a source of a web form document 30 illustrated in FIG. 7.

The automatic tool for generating an XSL document may convert Self Close Tags of the web form document through a process illustrated in FIG. 15. In this case, the form tags in the web form document may be converted as illustrated in FIGS. 16 to 20.

Figure 21:
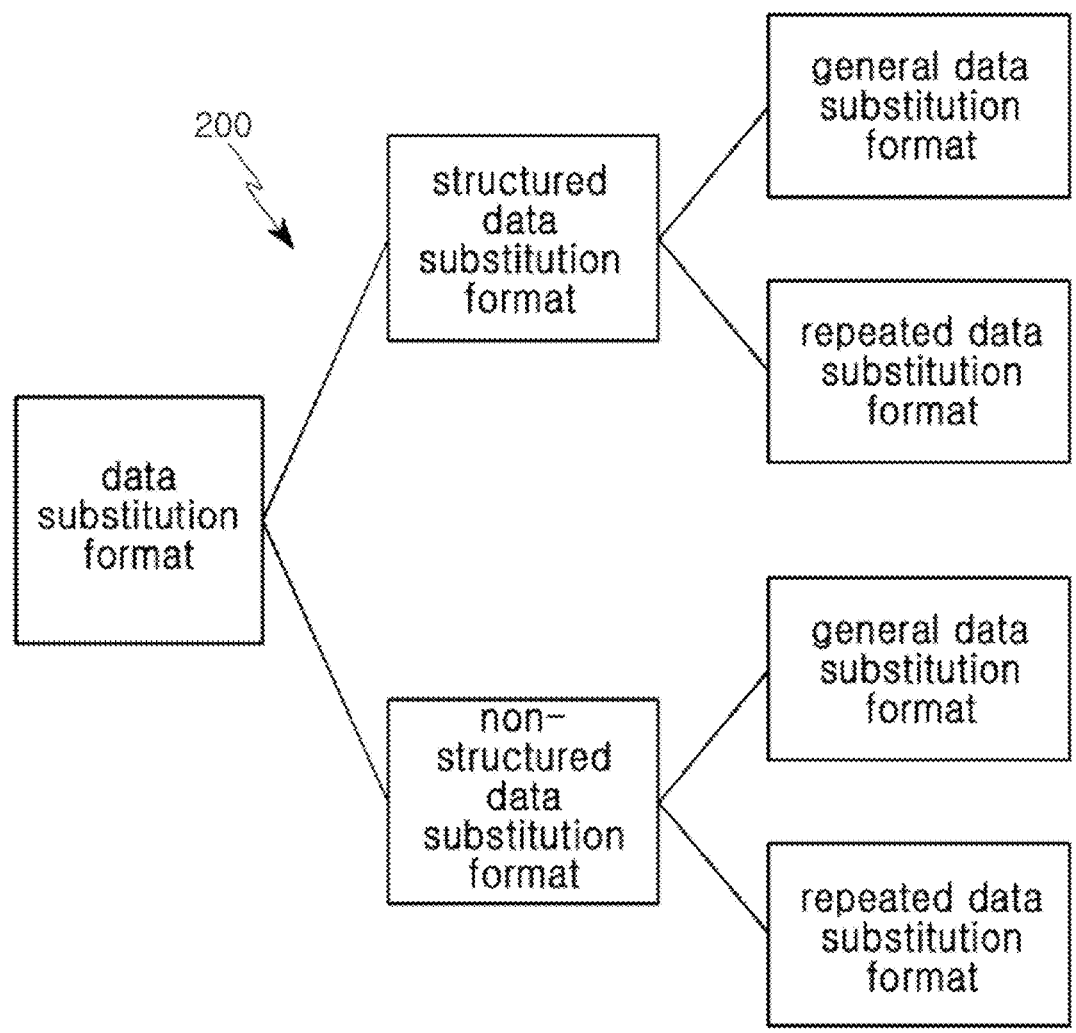
FIG. 21 is a classification map of a data substitution format.

FIG. 21 is a classification map 200 of a data substitution format 220.

As shown in FIG. 21, in the data substitution format setting process S61, the data substitution format 220 may include a structured data substitution format, which is for substitution of structured data, and a non-structured data substitution format, which is for substitution of non-structured data. In this case, the structured data substitution format or the non-structured data substitution format may include a general data substitution format and a repeated data substitution format.

Figure 22:
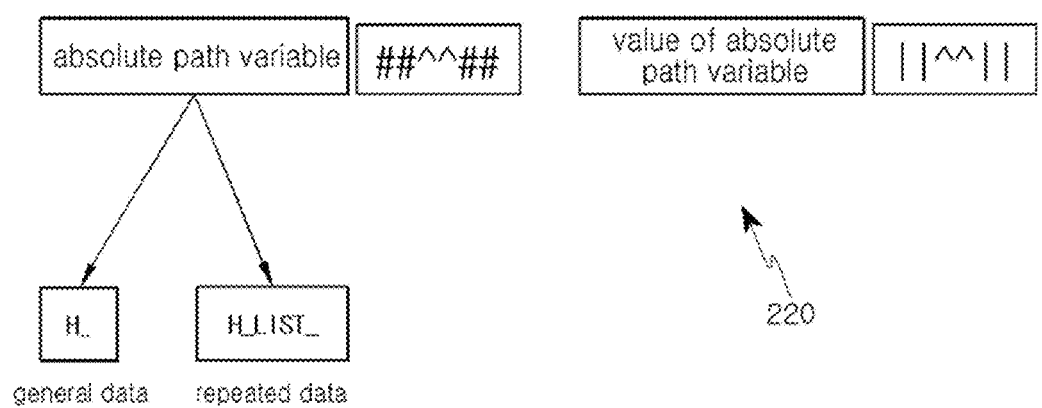
FIG. 22 is a view illustrating a data substitution format according to the present invention.

FIG. 22 is a view illustrating a data substitution format according 220 to the present invention.

Specifically, as shown in FIG. 22, the data substitution format may include a variable separator (##^##), which is in between the absolute path variable of the user-defined tag and the value of the absolute path variable, for distinguishing the absolute path variable from the value of the absolute path variable; and a line separator (\|^\|) at the end of the values of the absolute path variable for separating lines. In this case, the value of the absolute path variable may be comprised of the calculated substitution value of the structured and non-structured data.

In other words, the data substitution format may be divided as the following [Table 4], and the calculated substitution value of the structured and non-structured data may be illustrated as the following [Table 5].

The data mapping process S62 is a process for mapping the values of the absolute path variables of the source XML document 20 into calculated substitution values of the structured and non-structured data.

The new XML document creating process S63 is a process for creating a new XML document 10 by saving the source XML document 20 as the new XML document 10 after replacing the values of the absolute path variables in the source XML document 20 with the calculated substitution values of the structured and non-structured data.

Figure 23:
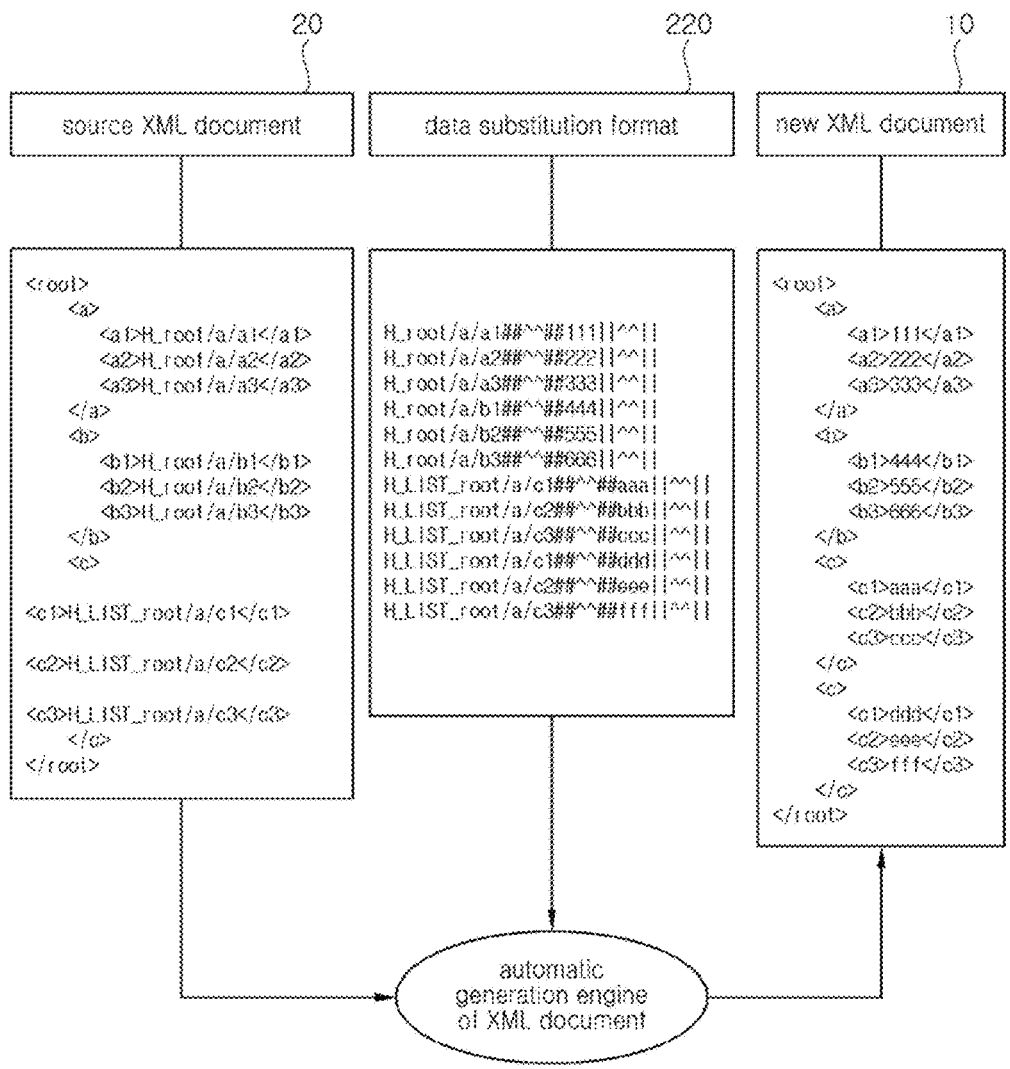
FIG. 23 is a view illustrating a process of creating a new XML document using a data substitution format according to the present invention.

FIG. 23 is a view illustrating a process of creating a new XML document 10 using a data substitution format according to the present invention.

In other words, in the step S60 of creating a new XML document, as shown in FIG. 23, the automatic generation engine of XML document may automatically create the new XML document 10 by the process of: setting data substitution formats by calculating substitution values of the structured and non-structured data; mapping the calculated substitution values of the structured and non-structured data into the values of the absolute path variables of the source XML document; and saving the source XML document 20 in which the values of the absolute path variables are replaced with the calculated substitution values, as a new XML document 10.

Referring again to FIG. 5, the step S70 of displaying a new XML document is a step for automatically displaying the content of the new XML document 10 by merging the new XML document 10 and the XSL document 100.

In other words, in the step S70 of displaying a new XML document, the content of the new XML document 10 may be displayed in a form of various HTML documents including a web form document by merging the new XML document 10 created in the step S60 of creating a new XML document and the XSL document 100 created in the step S40 of creating an XSL document. In this case, non-structured data included in the new XML document 10 may be converted using a conversion rule, and then displayed as the content of the HTML document.

The following [Table 6] illustrates a conversion rule for displaying non-structured data, which is stored in an XML tag, in an HTML document.

TABLE 6

| XML Tag | HTML |
| --- | --- |
| < | < |
| > | > |
| &lt; | < |
| &gt; | > |
| & | & |
| &nbsp; |   |

Hereinafter, a system for applying a method of implementing structured and non-structured data in an XML document according to the present invention will be described.

Figure 24:
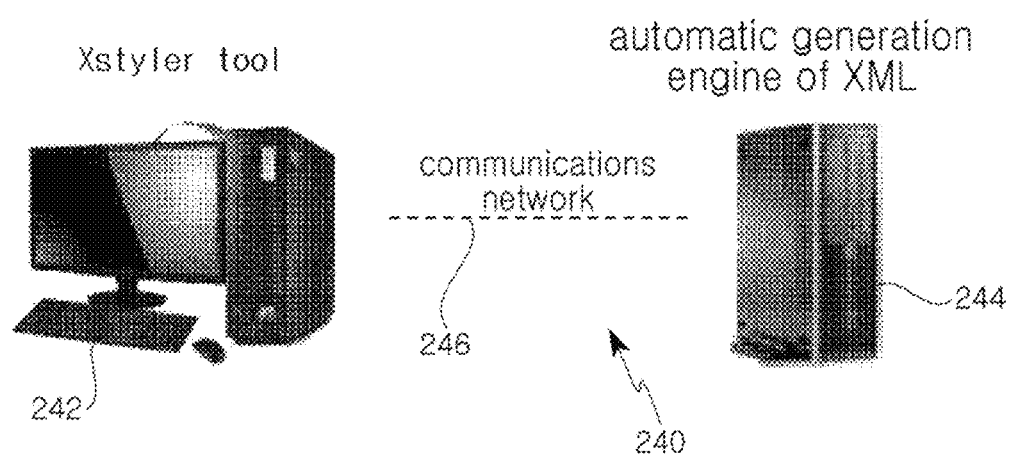
FIG. 24 is a block diagram of a system for application of the present invention.

FIG. 24 is a block diagram of a system 240 for application of the present invention.

As illustrated in FIG. 24, a system 240 for applying a method of implementing structured and non-structured data in an XML document may include a client computer 242 and a web server 244 that is connected to the client computer 242 through communications network 246.

In this case, by running Xsytler tool 1000, the client computer 242 may perform the steps, according to the present invention, including: the step S10 of designing a source HTML document; the step S20 of designing a source XML document; the step S30 of designing a web form document; and the step S40 of creating an XSL document, the Xstyler tool 1000 being a program for designing a source HTML document, a source XML document and a web form document, and for creating an XSL document associated with the web form document. Also, when through input devices of the client computer 242, a user inputs structured and non-structured data into the web form document opened on a web browser and saves the document, the web server may perform the steps, according to the present invention, including the step S60 of creating a new XML document and the step S70 of displaying a new XML document, by running an automatic generation engine of XML document for creating a new XML document and displaying the new XML document.

As described above, although the embodiments of the method of implementing structured and non-structured data in an XML document according to the present invention has been disclosed referring to drawings for illustrative purposes, those skilled in the art will appreciate that various modifications, additions and substitutions are possible, without departing from the scope and spirit of the invention as disclosed in the accompanying claims.

INDUSTRIAL APPLICABILITY

According to the present invention, using XML replacement technology, it is possible to quickly implement structured and non-structured data in a dynamic Well Formed eXtensible Markup Language document, thus the present invention may be effectively used in the computer application field.

The invention claimed is:

1. A method of implementing structured and non-structured data in an XML document, comprising the steps of:
    designing a source HTML document that contains a form tag;
    designing a structured source XML document with a user-defined tag;
    designing a web form document by mapping an absolute path variable of the user-defined tag into the source HTML document;
    automatically creating an XSL document by XSLT-processing the web form document;
    inputting structured data, non-structured data, or both into the web form document;
    automatically creating a new XML document from the structured source XML document by replacing the absolute path variable of the user-defined tag with the structured data or non-structured data input into the web form document; and
    automatically displaying content of the new XML document by merging content from the new XML document and content from the XSL document.

2. The method of claim 1, wherein in designing the source HTML document, the form tag is an empty form in which data is not contained.

3. The method of claim 1, wherein in designing the structured source XML document, using an XML tree structure, the structured source XML document stores the absolute path variable of the user-defined tag as a user-defined tag value.

4. The method of claim 1, wherein in designing the structured source XML document, when writing general data and repeated data, which are structured data of the structured source XML document, in a user-defined tag value, each type of data is written in different notation in order to distinguish the general data and the repeated data.

5. The method of claim 1, wherein in designing the structured source XML document, when structured data of the structured source XML document is repeated data, the repeated data is written using an attribute in the user-defined tag of the structured source XML document.

6. The method of claim 1, wherein in designing the web form document, the web form document is designed by mapping the absolute path variable of the user-defined tag into the form tag as a data format is designated to the form tag.

7. The method of claim 6, wherein designing the web form document comprises:
    a structured data form tag design process for designing a structured data form tag that is mapped into the absolute path variable of the user-defined tag and receives the structured data as input; and
    a non-structured data form tag design process for designing a non-structured data form tag that is mapped into the absolute path variable of the user-defined tag and receives the non-structured data as input.

8. The method of claim 1, wherein in automatically creating the XSL document, the XSL document is connected to the web form document through the absolute path variable of the user-defined tag.

9. The method of claim 1, wherein in automatically creating the XSL document, the XSL document is automatically created by an automatic tool for generating an XSL document, which is run on a computer system, when the web form document is saved.

10. The method of claim 1, wherein in automatically creating the new XML document, the new XML document is automatically created by an automatic generation engine of an XML document, which is run on a server, when structured data and non-structured data is input and stored into the web form document.

11. The method of claim 1, wherein automatically creating the new XML document comprises:
    a data substitution format setting process for setting a data substitution format by calculating a substitution value of the structured and non-structured data;

a data mapping process for mapping the calculated substitution value of the structured and non-structured data into a value of the absolute path variable of the source XML document; and a new XML document creating process for creating a new XML document by saving the XML source document as the new XML document after replacing the value of the absolute path variable of the source XML document with the calculated substitution value of the structured and non-structured data.

12. The method of claim 11, wherein in the data substitution format setting process, the data substitution format includes a structured data substitution format or a non-structured data substitution format, and the structured data substitution format or the non-structured data substitution format includes a general data substitution format or a repeated data substitution format.

13. The method of claim 12, wherein in the data substitution format setting process, the data substitution format includes a variable separator, which is in between the absolute path variable of the user defined tag and a value of the absolute path variable, for distinguishing the absolute path variable from the value of the absolute path variable.

14. The method of claim 13, wherein in the data substitution format setting process, the value of the absolute path variable is the calculated substitution value of the structured and non-structured data.

15. The method of claim 13, wherein in the data substitution format setting process, the data substitution format includes a line separator at the end of the value of the absolute path variable for separating lines.

16. A method of implementing structured and non-structured data in an XML document, comprising the steps of:

designing a source HTML document that contains a form tag, the form tag being an empty form in which data is not contained;

designing a structured source XML document with a user-defined tag, general and repeated data which are structure date of the structured source XML document written in different notations so as to be distinguishable;

designing a web form document by mapping an absolute path variable of the user-defined tag into the form tag of the source HTML document as a data format;

automatically creating an XSL document by XSLT-processing the web form document, the XSL document being connected to the web form document through the absolute path variable of the user-defined tag;

inputting structured data, non-structured data, or both into the web form document;

automatically creating a new XML document from the structured source XML document by replacing the absolute path variable of the user-defined tag with the structured data or non-structured data input into the web form document; and automatically displaying content of the new XML document by merging content from the new XML document and content from the XSL document, wherein, designing the web form comprises (a) a structured data form tag design process for designing a structured data form tag that is mapped into the absolute path variable of the user-defined tag and receives the structured data as input, and (b) a non-structured data form tag design process for designing a non-structured data form tag that is mapped into the absolute path variable of the user-defined tag and receives the non-structured data as input, and automatically creating the new XML document comprises (a) a data substitution format setting process for setting a data substitution format by calculating a substitution value of the structured and non-structured data, (b) a data mapping process for mapping the calculated substitution value of the structured and non-structured data into a value of the absolute path variable of the source XML document, and (c) a new XML document creating process for creating a new XML document by saving the XML source document as the new XML document after replacing the value of the absolute path variable of the source XML document with the calculated substitution value of the structured and non-structured data.

* * * * *